(12) United States Patent
Huang et al.

(10) Patent No.: US 12,057,117 B2
(45) Date of Patent: Aug. 6, 2024

(54) METHOD AND APPARATUS OF VERIFYING INFORMATION BASED ON A VOICE INTERACTION, DEVICE, AND COMPUTER STORAGE MEDIUM

(71) Applicant: Baidu Online Network Technology (Beijing) Co., Ltd., Beijing (CN)

(72) Inventors: Jizhou Huang, Beijing (CN); Haifeng Wang, Beijing (CN); Yingchao Shi, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 412 days.

(21) Appl. No.: 17/417,026

(22) PCT Filed: Nov. 25, 2020

(86) PCT No.: PCT/CN2020/131317
§ 371 (c)(1),
(2) Date: Jun. 21, 2021

(87) PCT Pub. No.: WO2021/232725
PCT Pub. Date: Nov. 25, 2021

(65) Prior Publication Data
US 2022/0335936 A1 Oct. 20, 2022

(30) Foreign Application Priority Data

May 22, 2020 (CN) .......................... 202010440069.1

(51) Int. Cl.
*G10L 15/22* (2006.01)
*G06F 16/33* (2019.01)
(Continued)

(52) U.S. Cl.
CPC .......... *G10L 15/22* (2013.01); *G06F 16/3329* (2019.01); *G06F 16/3343* (2019.01);
(Continued)

(58) Field of Classification Search
CPC .... G06F 16/3343; G06F 16/334; G06F 16/35; G06F 16/3344
See application file for complete search history.

(56) References Cited

U.S. PATENT DOCUMENTS

2005/0119875 A1* 6/2005 Shaefer ................. G06F 16/334
704/7
2013/0325473 A1 12/2013 Larcher et al.
(Continued)

FOREIGN PATENT DOCUMENTS

CN 106599933 4/2017
CN 107393541 11/2017
(Continued)

OTHER PUBLICATIONS

First Japanese Office Action, issued in the corresponding Japanese patent application No. 2021-536284, dated Sep. 6, 2022, 13 pages.
(Continued)

*Primary Examiner* — Thomas H Maung
(74) *Attorney, Agent, or Firm* — HSML P.C.

(57) ABSTRACT

The present disclosure provides a method and an apparatus of verifying information based on a voice interaction, a device, and a computer storage medium, and relates to a field of artificial intelligence technology. The present disclosure is implemented to include: acquiring a text of a voice response of a user to a voice inquiry, wherein the voice inquiry is provided for verifying information with the user; and inputting each character of the text of the voice response and a phonetic information associated with the each character to a pre-trained semantic analysis model so as to obtain an user intention information and/or an information of an object to be verified output by the pre-trained semantic analysis model, wherein the user intention information includes a confirmation, a denial, an answer, or a question.

15 Claims, 6 Drawing Sheets

(51) Int. Cl.
  *G06F 16/332* (2019.01)
  *G06F 40/35* (2020.01)
  *G10L 15/18* (2013.01)
(52) U.S. Cl.
  CPC .......... *G06F 16/3344* (2019.01); *G06F 40/35* (2020.01); *G10L 15/18* (2013.01); *G10L 2015/223* (2013.01); *G10L 2015/225* (2013.01)

(56) References Cited

U.S. PATENT DOCUMENTS

| | | |
|---|---|---|
| 2019/0138330 A1 | 5/2019 | Wu |
| 2019/0370843 A1 | 12/2019 | Chen et al. |
| 2020/0066255 A1 | 2/2020 | Madan et al. |
| 2020/0135213 A1 | 4/2020 | Kim et al. |
| 2021/0117780 A1* | 4/2021 | Malik ................. G06V 20/30 |

FOREIGN PATENT DOCUMENTS

| | | |
|---|---|---|
| CN | 107665706 | 2/2018 |
| CN | 107731234 | 2/2018 |
| CN | 107809547 | 3/2018 |
| CN | 108334496 | 7/2018 |
| CN | 108549637 | 9/2018 |
| CN | 108920666 | 11/2018 |
| CN | 109670041 | 4/2019 |
| CN | 109753264 | 5/2019 |
| CN | 110188361 | 8/2019 |
| CN | 110286778 | 9/2019 |
| CN | 20191001 | 10/2019 |
| CN | 110322888 | 10/2019 |
| CN | 110807333 | 2/2020 |
| CN | 110830667 | 2/2020 |
| CN | 111696535 | 9/2020 |
| JP | 2001-125900 | 5/2001 |
| JP | 2009-116493 | 5/2009 |
| JP | 2014-142566 | 8/2014 |
| JP | 2016-042293 | 3/2016 |

OTHER PUBLICATIONS

Extended European Search Report, issued in the corresponding European Patent Application No. 20900685.7, dated Feb. 17, 2022, 9 pages.
Kim et al., "Intent Detection Using Semantically Enriched Word Embeddings", 2016 IEEE Spoken Language Workshop (SLT), IEEE, Dec. 13, 2016, pp. 414-419.
European Office Action, issued in the corresponding European patent application No. 20900685.7 dated Dec. 15, 2022, 5 pages.
International Search Report and Written Opinion, issued in the corresponding PCT Application No. PCT/CN2020/131317, dated Feb. 25, 2021, 11 pages.
First Chinese Office Action, issued in the corresponding Chinese application No. 202010440069.1, dated Mar. 5, 2021, 12 pages.
Second Chinese Office Action, issued in the corresponding Chinese application No. 202010440069.1, dated May 19, 2021, 3 pages.
Meena et al., "Data-driven models for timing feedback responses in a Map Task dialogue system", Computer Speech and Language, vol. 28, 2014, pp. 908-922.
Ning Yishuang, "User Intention Understanding and Feedback Generation for Intelligent Speech Interaction", Tsinghua University, Apr. 2017, 101 pages.

* cited by examiner

METHOD AND APPARATUS OF VERIFYING INFORMATION BASED ON A VOICE INTERACTION, DEVICE, AND COMPUTER STORAGE MEDIUM

This application is a Section 371 National Stage Application of International Application No. PCT/CN2020/131317, filed on Nov. 25, 2020, entitled "METHOD AND APPARATUS OF VERIFYING INFORMATION BASED ON VOICE INTERACTION, DEVICE, AND COMPUTER STORAGE MEDIUM", which claims priority to Chinese patent application No. 2020104400691, filed on May 22, 2020, entitled "METHOD AND APPARATUS OF VERIFYING INFORMATION BASED ON VOICE INTERACTION, DEVICE, AND COMPUTER STORAGE MEDIUM", which are incorporated herein by reference in their entirety.

TECHNICAL FIELD

The present disclosure relates to a field of computer technology, in particular to a field of artificial intelligence technology.

BACKGROUND

In map applications, geographic location points can be POI (Point of Interest), AOI (Area of Interest) or ROI (Region of Interest) having a wider range, especially places closely related to people's lives, such as schools, banks, restaurants, hospitals, supermarkets, etc. A geographical location often includes information such as name, coordinates, address, category and telephone number. Geographic location information is usually obtained by field collection, Internet data acquisition and user reporting. Due to the rapid development of urban construction and the change of business unit planning, the geographic location information will also change frequently.

Geographic point retrieval and map navigation are based on geographic point information, so the accuracy of geographic point data is very important for the accuracy and availability of various kinds of map applications. In order to improve the accuracy of geographic point data, map applications need to verify the existing geographic point information.

SUMMARY

In view of this, the present disclosure provides a method and an apparatus of verifying information based on a voice interaction, a device, and a computer storage medium.

According to a first aspect, there is provided a method of verifying information based on a voice interaction, including:

acquiring a text of a voice response of a user to a voice inquiry, wherein the voice inquiry is provided for verifying information with the user; and inputting each character of the text of the voice response and a phonetic information associated with the each character to a pre-trained semantic analysis model so as to obtain an user intention information and/or an information of an object to be verified output by the pre-trained semantic analysis model, wherein the user intention information includes a confirmation, a denial, an answer, or a question.

According to a second aspect, there is provided a method of training a semantic analysis model, including:

acquiring training data, wherein the training data includes a text of a voice response of a user to a voice query, and a label denoting an user intention information and/or an information of the object to be verified for the text of the voice response; and training the semantic analysis model, by taking each character in the text of the voice response in the training data and phonetic information associated with the each character as an input of the semantic analysis model and taking the user intention information and/or the information of the object to be verified denoted by the label as a target output of the semantic analysis model, wherein the user intention information includes a confirmation, a denial, an answer, or a question.

According to a third aspect, there is provided an apparatus of verifying information based on a voice interaction, including a semantic analysis module configured to:

acquire a text of a voice response of a user to a voice inquiry, wherein the voice inquiry is provided for verifying information with the user; and input each character of the text of the voice response and a phonetic information associated with the each character to a pre-trained semantic analysis model so as to obtain an user intention information and/or an information of an object to be verified output by the pre-trained semantic analysis model, wherein the user intention information includes a confirmation, a denial, an answer, or a question.

According to a fourth aspect, there is provided an apparatus of training a semantic analysis model, including:

a data acquisition module configured to acquire training data, wherein the training data includes a text of a voice response of a user to a voice query, and a label denoting an user intention information and/or an information of the object to be verified for the text of the voice response; and a model training module configured to train the semantic analysis model, by taking each character in the text of the voice response in the training data and phonetic information associated with the each character as an input of the semantic analysis model and taking the user intention information and/or the information of the object to be verified denoted by the label as a target output of the semantic analysis model, wherein the user intention information includes a confirmation, a denial, an answer, or a question.

According to a fifth aspect, there is provided an electronic device, including:

at least one processor; and a memory communicatively connected to the at least one processor, wherein the memory has instructions executable by the at least one processor stored thereon, and the instructions, when executed by the at least one processor, cause the at least one processor to implement any of the methods as described above.

According to a fifth aspect, there is provided a non-transitory computer-readable storage medium storing computer instructions for a computer to implement any of the methods as described above.

Other effects of the above alternatives will be described in the context in combination with embodiments.

BRIEF DESCRIPTION OF THE ACCOMPANYING DRAWINGS

The accompanying drawings are used to better understand the present disclosure, and do not constitute a limitation to the present disclosure, wherein.

DETAILED DESCRIPTION

Hereinafter, exemplary embodiments of the present disclosure may be described with reference to the accompanying drawings, various details of the embodiments of the present disclosure are included to facilitate understanding, and the details should be considered as merely exemplary. Therefore, those of ordinary skill in the art should realize that various changes and modifications may be made to the embodiments described herein without departing from the scope and spirit of the present disclosure. In addition, for clarity and conciseness, descriptions of well-known structures and technologies are omitted in the following description.

Generally, methods adopted in verification of geographic location information include verification by field collection and verification by telephone call of manual customer service. Verification by field collection means that a map information collector arrives at the geographic location point and verifies information of the geographic location point by surveying, photographing, inquiring and the like. Verification by field collection is widely used in the construction of geographic information in the early non information age. However, Verification by field collection requires a lot of manpower and material resources, which is not only inefficient, but also requires the professional ability of the operators. It is not suitable for a large number of data operations, and has been basically abandoned at present.

Verification by telephone call of manual customer service means that customer service takes a telephone call with the geographic location point, to verify information by manual dialogue. Verification personnel can get information feedback by telephone without arriving at the field. Through direct communication with users, it is easier for manual customer service to obtain accurate information. At the same time, this method has low operational requirements, and does not require manual customer service to have special professional ability. For example, the manual customer service can ask the name, address, business hours and other attribute information of the geographical location point based on the existing information, make a mark indicating whether the information of the geographical location point is correct through feedback from the other party, and update the information.

However, verification by telephone call of manual customer service requires a lot of persons to participate, having high labor cost and low efficiency, e.g. a person can only verify 100 to 200 items a day. Additionally, it's difficult for manual customer service to work stably for a long time due to fatigue and emotion.

Figure 1:
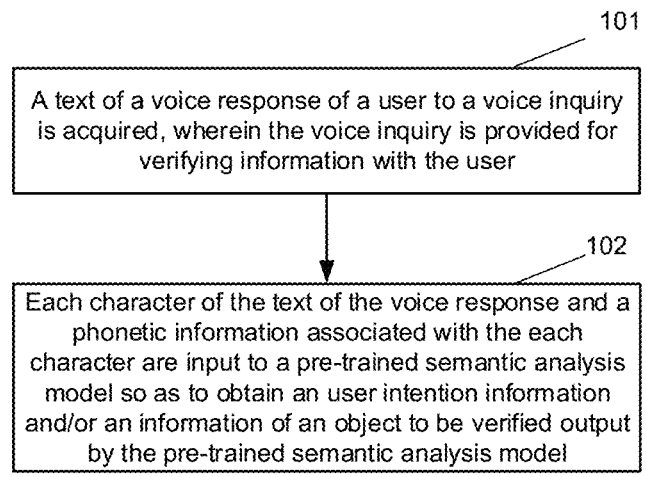
FIG. 1 is a main flow chart according to an embodiment of the disclosure.

In view of this, the present disclosure provides a method of verifying information based on a voice interaction. As shown in FIG. 1, the method mainly includes the following operations.

In operation 101, a text of a voice response of a user to a voice inquiry is acquired, wherein the voice inquiry is provided for verifying information with the user.

In operation 102, each character of the text of the voice response and a phonetic information associated with the each character are input to a pre-trained semantic analysis model so as to obtain an user intention information and/or an information of an object to be verified output by the pre-trained semantic analysis model.

The user intention information may include a confirmation, a denial, an answer, or a question. The confirmation represents the user's confirmation of the information to be verified for the voice inquiry, the denial represents the user's denial of the information to be verified for the voice inquiry, the answer represents the user's answer to the information to be verified for the voice inquiry, and the question represents the user's question to the information to be verified for the voice inquiry. Usually, the above-mentioned text of voice response is accompanied by an information of an object to be verified, which is provided by the user, under an intention of denial and an intention of answer. Of course, the text of voice response may not contain the user's intention but only the information of the object to be verified.

If the information of the object to be verified is obtained, the information of the object to be verified can be stored, or a stored information can be updated by using the information of the object to be verified. If the user intention information is obtained, the information of the object to be verified can be inferred based on the user intention information. The inferred information of the object to be verified is stored, or a stored information is updated with the inferred information of the object to be verified.

For example, if the voice query is "请问是幸福超市吗(Is this Xingfu supermarket)" and the text of the voice response provided by the user is "是的，这里是幸福超市 (Yes, this is Xingfu supermarket)", the name of the geographical location point to be verified is determined to be "幸福超市(Xingfu supermarket)".

In another example, if the voice query is "请问是幸福超市吗(Is this Xingfu supermarket)" and the text of the voice response provided by the user is "(是的) (Yes)", it is inferred that the name of the geographical location point to be verified is" 幸福超市 (Xingfu supermarket)".

In another example, if the voice query is" 请问是幸福超市吗 (Is this Xingfu supermarket)" and the text of the voice response provided by the user is " 不是，这里是新富超市 (No, this is Xinfu supermarket)", the name of the verified geographical location point will be determined as " 新富超市 (Xinfu supermarket)". Or further, through the geographic location point linking mechanism and/or further dialogue, determine whether the name of the geographical location point to be verified is " 幸福 超市". The geographic location point linking mechanism will be described in the subsequent embodiments.

In another example, if the voice query is "请问是幸福超市吗 (Is this Xingfu supermarket)" and the text of the voice response provided by the user is "不是(No)", further voice query "请问您是哪里 (Where are you)" is needed to determine the name of the geographical location point to be verified. If the user further feedback "这里是新富超市 (This is Xinfu supermarket)", the user's intention is identified as "an answer", and the name of the geographical location point to be verified is determined as "新富超市 (Xinfu supermarket)".

In addition, it should be noted that the object to be verified as referred in the present disclosure may be an object to be verified in any field, such as geographic location points in map applications, transaction information in the field of e-commerce, commodity information, etc. In the following embodiments, only the geographic location point in the map application is described as an example. In this case, corresponding information of the object to be verified may include but not limited to attribute information such as the name, category, address, business hours, contact number, operator of the geographical location point.

In view of the above, with the methods and apparatus according to the present disclosure, semantic analysis may be performed on the text of the voice response of the user to the voice query, so as to obtain the user intention information and/or the information of the object to be verified, achieving automatic information verification.

Figure 2:
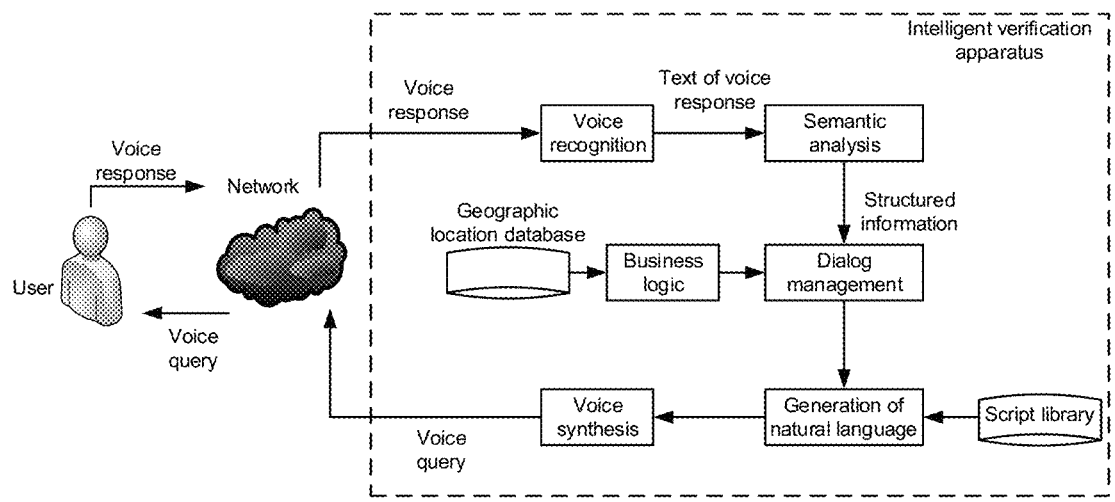
FIG. 2 is a schematic diagram of architecture of verifying information based on a voice interaction according to an embodiment of the disclosure.

In order to facilitate the understanding of the method provided in the present disclosure, firstly, an architecture of verifying information based on a voice interaction is described. As shown in FIG. 2, in the architecture based on voice interaction according to the present disclosure, after a user establishes a communication connection with an apparatus of verifying information based on a voice interaction (referred to as the intelligent verification apparatus) according to the embodiment of the disclosure, the intelligent verification apparatus may carry out voice interaction with the user through the communication connection for information verification. For example, it is possible to verify information with the user by telephone, by network voice call, and by network voice message etc.

The intelligent verification apparatus first uses a script library to generate natural language. A voice is generated by voice synthesis of a text of the generated natural language, and broadcasted to the user through the network. The voice is usually voice inquiry. After hearing the voice query, the user may provide a voice response to the voice query and the voice response may be provided to the intelligent verification apparatus through the network. The intelligent verification apparatus may obtain a text of the voice response by voice recognition. Semantic analysis is performed on the text of the voice response text to extract structured information from the text of the voice response. In the embodiment of the present disclosure, the structured information may be the information of the object to be verified. Furthermore, dialogue management may be further performed based on a result of the semantic analysis. In the dialogue management, a business logic is invoked to update a database of geographic location points by using the extracted structured information. On the other hand, generation of natural language may continue until information verification is completed.

Operations performed by the above intelligent verification apparatus are described in detail hereinafter.

(1) Voice Recognition Processing

Sound is essentially a kind of wave, that is, sound wave. This kind of wave can be processed as a kind of signal, so the essence of voice recognition processing is to process a sequence of signals played over time and then output a sequence of texts. In short, voice recognition is a process of converting an input of voice fragment into an output of text. The process of voice recognition mainly relies on acoustic model and language model.

Before a voice (mainly the voice response provided by the user in this embodiment) being input to the acoustic model, preprocessing and feature extraction is performed on the voice. In practice, it is difficult to obtain a high fidelity voice without noise. Actually, the obtained voice data more or less have noise. Therefore, before inputting the voice data to the acoustic model, it is desired to convert signal from time domain to frequency domain by preprocessing technologies such as noise elimination and channel enhancement and then extract effective feature vectors from the voice data for the acoustic model. Next, the acoustic model may convert the feature vectors obtained from the preprocessing part into acoustic model scores, while the language model may obtain a language model score. Finally, the acoustic model score and the language model score may be integrated in a decoding and searching stage, and a word sequence with the highest score will be taken as a final recognition result. This is the general principle of voice recognition.

Voice signals are diverse. Different speakers (voice), attitudes (style, environment) and context will lead to different voice signals representing the same word. Even if one person speaks the same sentence, it is impossible to guarantee that the voice signals generated at two times are the same. It is a great challenge to determine the real meaning of a voice signal and transform the voice signal into correct text by using a model. After investigation, it is found that the scripts and the user feedbacks have relatively concentrated contents in a scene of verifying geographical location point. Although the result of voice recognition has a relatively high error rate, the problems are more concentrated, mainly on error recognition of the name of the geographical location point.

In an embodiment of the disclosure, the acoustic model and the language model are used to recognize the user's voice response for voice inquiry, so as to obtain a text of the voice response. Dictionary data of geographical location point is introduced in training of the acoustic model and the language model.

Firstly, the acoustic model is described. Acoustic model can be understood as the modeling of voice, which can transform a voice input into an acoustic output, in other words, give a probability that a voice belongs to an acoustic symbol. In English language, the acoustic symbol may be a syllable or a phoneme with a smaller granularity. In Chinese language, the acoustic symbol may be an initial and/or a final of pinyin, or a phoneme with the same granularity as in English language.

Figure 3:
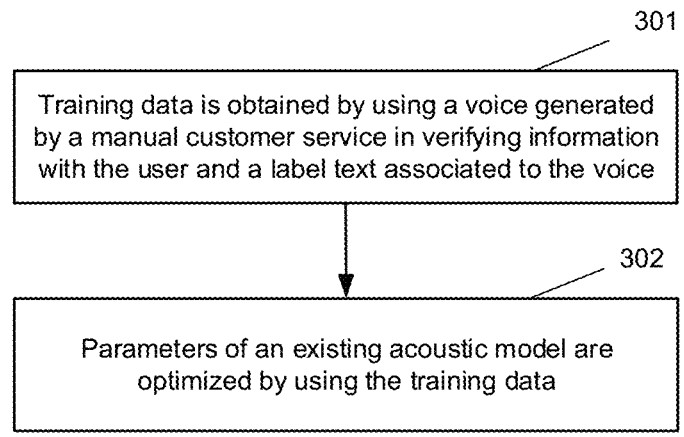
FIG. 3 is a flow chart of the method for training an acoustic model according to an embodiment of the disclosure.

In the present disclosure, the acoustic model may be directionally optimized through fine tuning, as shown in FIG. 3. The optimization includes following operations.

In operation 301, training data is obtained by using a voice generated by a manual customer service in verifying information with the user and a label text associated to the voice.

In this embodiment, voice recognition may be performed on the voice generated by the manual customer service in verifying information with the user, a geographical location point may be located and a name of the geographical location point may be determined. The name of the geographical location point may be corrected into a correct text for manually labeling, so as to form a "voice-text" pair, and then phoneme information corresponding to the text may be labeled as the training data.

In operation 302, parameters of an initial acoustic model are optimized by using the training data.

Assuming a set of training samples is $S=\{(x^1, z^1), (x^2, z^2), \ldots (x^N, z_N)\}$, it means that there are N training samples, where $x^i$ is the $i^{th}$ voice sample and $z^i$ is a phoneme associated with the $i^{th}$ voice sample. The voice sample is input as a sequence, and the phoneme information is output as a sequence.

Figure 4:
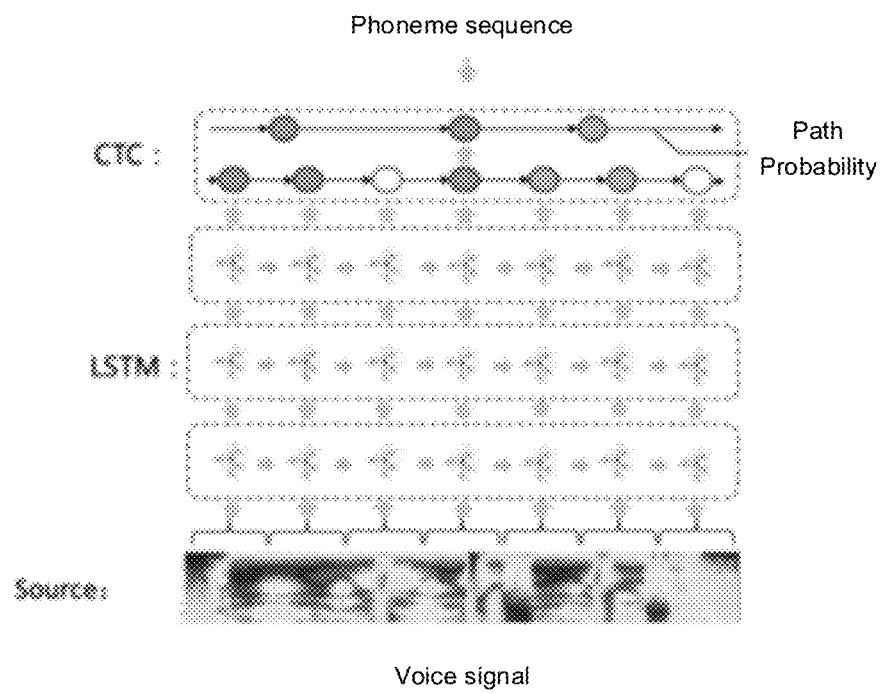
FIG. 4 is a structural diagram of the acoustic model according to an embodiment of the disclosure.

The present disclosure does not limit the structure of the acoustic model, for example, the structure of the acoustic model may be implemented as bi-LSTM (bi-directional Long Short Term Memory)+CTC (Connectionist Temporal Classification), as shown in FIG. 4.

Training is performed for an objective that the phoneme sequence output by CTC conforms to the corresponding phoneme label in the training sample. A loss function may be contrasted based on the objective of training, and the model parameters may be optimized according to a result of the loss function. There are acoustic models working well at present, and these acoustic models may be improved in specific fields. Therefore, for a geographical location point, the training data focuses on the voice including the geographical location point and the label for the voice. Therefore, such training data may be used for fine tuning only. That is to say, such training data is used to optimize parameters of an initial acoustic model. Because weights of the original acoustic models have been smoothed, there is no need to distort them, and the learning rate of the initial acoustic models is reduced in the training process.

Language model may be understood to have a function of eliminating the problem caused by homophones or similar pronunciations. After the phoneme sequence is given by the acoustic model, a string sequence with the highest probability is determined from candidate text sequence. In the present disclosure, data enhancement may be performed on the training samples used in training of the language model by using a geographic location point dictionary, and the voice model may be trained by using a RNN model. Detail descriptions will be omitted to avoid redundancy.

In this manner, the effect of voice recognition is greatly improved. Especially for names of some low-frequency geographic location points, the recognition accuracy is greatly improved.

(2) Semantic Analysis

Semantic analysis is intended to transform text information into machine-readable semantic representation, which is generally in form of structured information. Because the same meaning may be expressed in different ways, it is not important for a machine to understand the exact meaning of each word in a sentence, but it is important to understand the meaning of the sentence. For example, all of the expressions "我家是幸福超市 (My store is Xingfu supermarket)", "我家店的名字是幸福超市 (My store's name is Xingfu supermarket)", "我家的店名叫 幸福超市 (My store is called Xingfu supermarket)" have a meaning of the user's store's name is "Xingfu supermarket", so the structured information "幸福超市 (Xingfu supermarket)" is required to be recognized from these expressions.

In the embodiment of the present disclosure, the user's intention information and/or the information of the object to be verified are mainly recognized from the text of the user's voice response. Herein both the user's intention information and the information of the object to be verified being identified is taken as an example. This may be implemented as described in FIG. 1. In other words, each character of the text of the voice response and a phonetic information associated with the each character are input to a pre-trained semantic analysis model so as to obtain an user intention information and/or an information of an object to be verified output by the pre-trained semantic analysis model.

Figure 5:
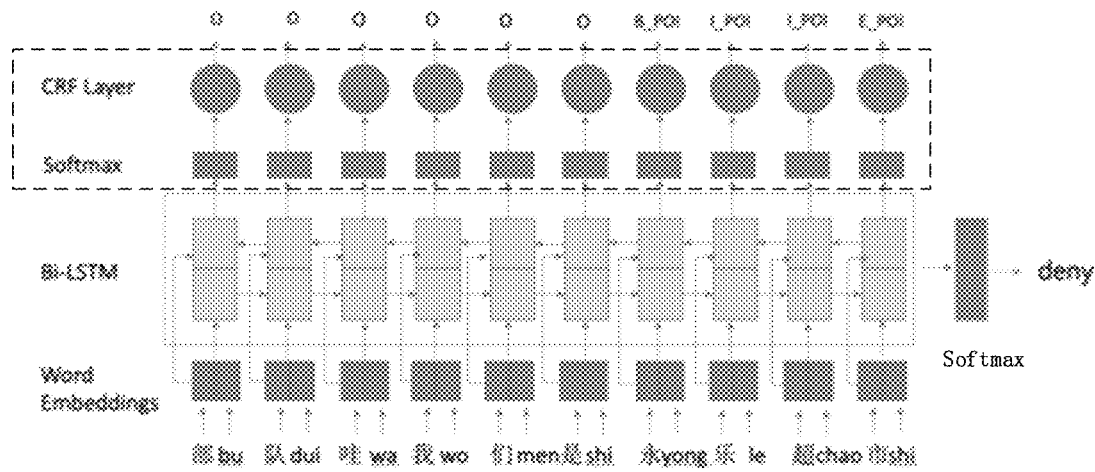
FIG. 5 is a schematic diagram of a semantic analysis model according to an embodiment of the disclosure.

The semantic analysis model according to the embodiment of the disclosure may include an embedding layer, a sequence modeling layer, a mapping layer and a prediction layer. FIG. 5 is a schematic diagram of a semantic analysis model according to the embodiment of the disclosure.

The embedding layer, represented as Word Embeddings in FIG. 5, is used to encode the each character and the phonetic information associated with the each character. In the present disclosure, for Chinese characters, the phonetic information can be pinyin or other forms of phonetic information. In FIG. 5, taking pinyin as an example, encoding the pinyin of each character can effectively eliminate the problem of inaccurate voice recognition caused by homophones. In semantic analysis, it is possible to correctly recognize the user's intention information and the information of the object to be verified, even if the result of voice recognition is not accurate.

The sequence modeling layer is used to learn a semantic dependency between characters by using an encoding result from the embedding layer. In FIG. 5, Bi LSTM is taken as an example.

The mapping layer is used to obtain the user intention information through mapping by using a max-pooling result of an implicit vector output by the sequence modeling layer. The mapping layer in FIG. 5 implemented as Softmax is taken as an example.

The prediction layer is used to predict the information of the object to be verified by using the implicit vector of each sequence output by the sequence modeling layer. The prediction layer in FIG. 5 implemented as Softmax+CRF layer is taken as an example.

The mapping layer and the prediction layer are used for recognizing user's intention and predicting information of the object to be verified respectively. If only one of recognizing and predicting is required to be achieved, only one of the mapping layer and the prediction layer may be employed.

Given a sentence $S=W_1, W_2, W_3 \ldots, W_T$ input by a user, where $W_i$ represents the $i^{th}$ character in the sentence, and T represents the length of the sentence. Each word is represented by a word vector $e(W_i)$. Assuming that the input sequence is x and the output sequence of the prediction layer is represented as y.

The Bi LSTM layer splices the forward and backward outputs. Therefore, for an input $x_t$, an output $\vec{h}_t$ of corresponding hidden layer is as follows:

$$\vec{h}_t = [\vec{h}_t, \overleftarrow{h}_t]$$

The output $y_t^s$ of prediction layer and the output $y^u$ of the mapping layer are as follows:

$$y_t^s = \text{soft max}(W^s \vec{h}_t + b^s)$$

$$y^u = \text{soft max}(W^u h^u + b^u)$$

where $h^u$ is a result of maximum pooling of implict vectors, i.e.:

$$h^u = \max_{t=1}^{T} \vec{h}_t$$

$W^s$, $W^u$, $b^s$, and $b^u$ are parameters of the model.

With reference to FIG. 5, after embedding each character and the audio of each character for a voice recognition result "部队哇，我们是永乐超市 (Buduiwa, we are Yongle supermarket)", an implicit vector is output by the Bi-LSTM, and the user's intention information is determined as a denial (represented by deny in FIG. 5) by the mapping layer through mapping by using a maximum pooling result of the implicit vector. Prediction is performed by the prediction layer by using the implicit vector of each sequence, to obtain a name "永乐超市 (Yongle supermarket)" of the POI. Among the labels of the various characters output by CRF, B_POI represents a beginning character for the POI, I_POI represents an intermediate character for the POI, and E_POI represents an end character for the POI. It can be seen that by introduction of pinyin of each character, even if the result of voice recognition is not correct, e.g. "不对哇 (No)" is wrongly recognized as "部队哇 (Buduiwa)", users' intention can be correctly identified as a denial by using this semantic analysis model.

Figure 6:
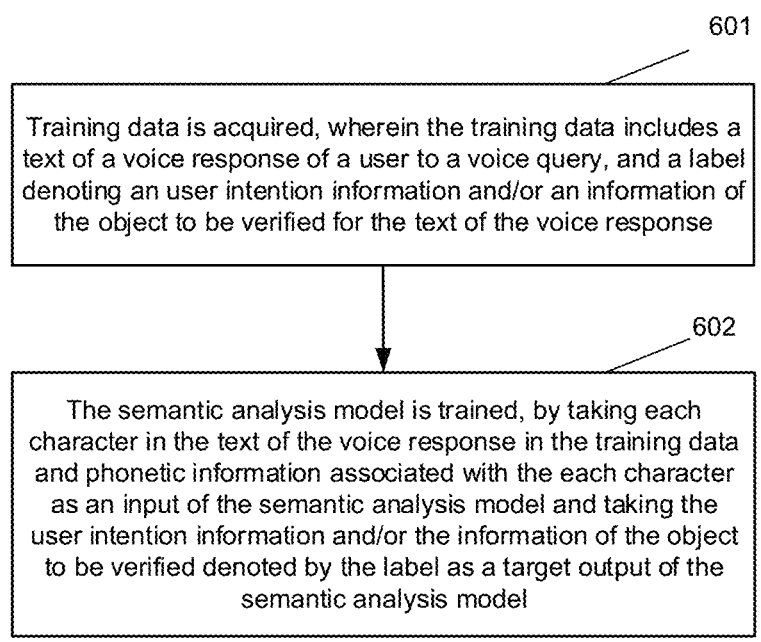
FIG. 6 is a flow chart of a method of training the semantic analysis model according to an embodiment of the disclosure.

FIG. 6 is a flow chart of a method of training a semantic analysis model according to an embodiment of the disclosure. As shown in FIG. 6, the method may include the following operations.

In operation 601, training data is acquired, wherein the training data includes a text of a voice response of a user to a voice query, and a label denoting a user intention information and/or an information of the object to be verified for the text of the voice response.

Due to the high cost and low efficiency of manual labeling of data, labeling data with an aid of machine is considered. In this scenario, sentences expressed by users have similar formats. Therefore, various wrong recognition results are mostly caused by noise, voice recognition and other problems. For such kind of data distribution, an embodiment of the present disclosure proposes a semi-supervised method which is described in detail below.

Firstly, a seed sample is obtained by acquiring and manually labeling a text of a high-frequency voice response for a same voice query.

That is, for each question such as "请问，你家是*吗 (Excuse me, is there *)", a text of a high-frequency user response is labeled, including labeling information of a geographic location point, such as a name of a POI.

Then, texts of voice responses in a historical database are clustered by similarity using the seed sample, wherein the texts of voice responses are generalized by object information.

For example, POI names are generalized and clustered according to results of labeling.

A generalization result "对的，我家就是 [POI-NAME] 啊 (Yes, this place is [POI-NAME])" corresponds to a label of confirm (POI_NAME).

A generalization result "是的呀，是 [POI-NAME](Yes, it is [POI-NAME])" corresponds to a label of confirm (POI_NAME).

A generalization result "嗯对 (Yes)" corresponds to a label of confirm ( ) A generalization result "我们家改名字了，改成 [POI-NAME](We have changed our name to [POI-NAME])" corresponds to a label of deny (POI_NAME).

In the process of clustering, word vector and pinyin similarity may be introduced in similarity calculation.

Finally, the text of the voice response corresponding to each user intention information is acquired as the training data, according to a result of the clustering.

In operation 602, the semantic analysis model is trained, by taking each character in the text of the voice response in the training data and phonetic information associated with the each character as an input of the semantic analysis model and taking the user intention information and/or the information of the object to be verified denoted by the label as a target output of the semantic analysis model.

The structure of the semantic analysis model is still shown in FIG. 5. Because a task of recognizing user intention and a task of recognizing information of the object to be verified are both included, the two tasks can be trained separately or jointly. Because there is a great correlation between the two tasks, joint training has a better effect and thus is preferred.

The loss function of user intention recognition may be expressed in form of cross entropy:

$$L^u(\theta) = -\log y^u(l^u)$$

where $l^u$ represents a corresponding actual user intention.

The loss function of CRF can be directly reused in recognizing the information of the object to be verified. The loss function of CRF includes two parts: a score of a real path and a score of a total score of all paths. The real path should have the highest score among all the paths.

The formula for calculating the score of the path is as follows:

$$\text{Score}(x^i, y^i) = \sum_m h^i_m[y^i_m] + P[y^i_{m-1}, y^i_m]$$

In the above formula, the superscript of the letter represents the $i^{th}$ character in a corresponding input sequence, and the subscript of the letter represents the $m^{th}$ sequence of the $i^{th}$ character. P is a transition matrix, which represents a score value of transition of the label from $y_{m-1}^i$ to $y_m^i$.

Since score of each sequence may be calculated according to the above formula, it is only needed to maximize the score of a correct sequence. Accordingly, the loss function is as follows:

$$\mathcal{L}^s(\theta) = -\sum_i \log([P(x^i | y^i, \theta)]) = -\text{Score}(x, y) + \log\left(\sum_{y'} \exp(\text{Score}(x, y'))\right)$$

where $$P(x | y, \theta) = \frac{\exp(\text{Score}(x, y))}{\sum_{y'} \text{Score}(x, y')},$$

y' represents all possible sequences.

Then a joint loss function is calculated by using the above two loss functions. The joint loss function may be obtained by weighting the above $L^u(\theta)$ and $L^s(\theta)$.

In this way, the accuracy of semantic analysis is improved. However, for the information of the object to be verified, it may still be inaccurate. For example, the name of POI "永乐超市 (Yongle supermarket)" is probably correct. But for some space-time scenes, it may be "勇乐超市 (Yongle supermarket)", "涌乐超市 (Yongle supermarket)" and so on. In order to solve this problem, the information of the object to be verified may be further linked to an object information in a domain knowledge library related to the object to be verified. For example, the name of the POI is linked to a name of POI in the POI repository.

Specifically, the domain knowledge library may be built in advance. The domain knowledge library may include information of geographic location point, including name, type, address, coordinates, contact information, etc. Then, based on at least one of voice similarity, text similarity and attribute similarity, the information of the object to be verified is classified into the domain knowledge library, and the object to be verified is linked to the object information in the domain knowledge library. If the object information to be linked to is determined, the information of the object to be verified is updated with the determined object information. In the above classification, actually a pre-constructed classifier is used to classify the information of the object to be verified, which is determined by the above semantic analysis. The classes output by the classifier are existing geographical location points in the domain knowledge library, that is, the classifier calculates the probability that the information of the object to be verified obtained by semantic analysis belongs to the existing geographical location points in the domain knowledge library. According to the probability, it is determined whether the object to be verified is linked to an existing geographical location point in the domain knowledge library. If the object to be verified is linked to an existing geographical location point in the domain knowledge library, determine which existing geographic location point is linked to.

Figure 7:
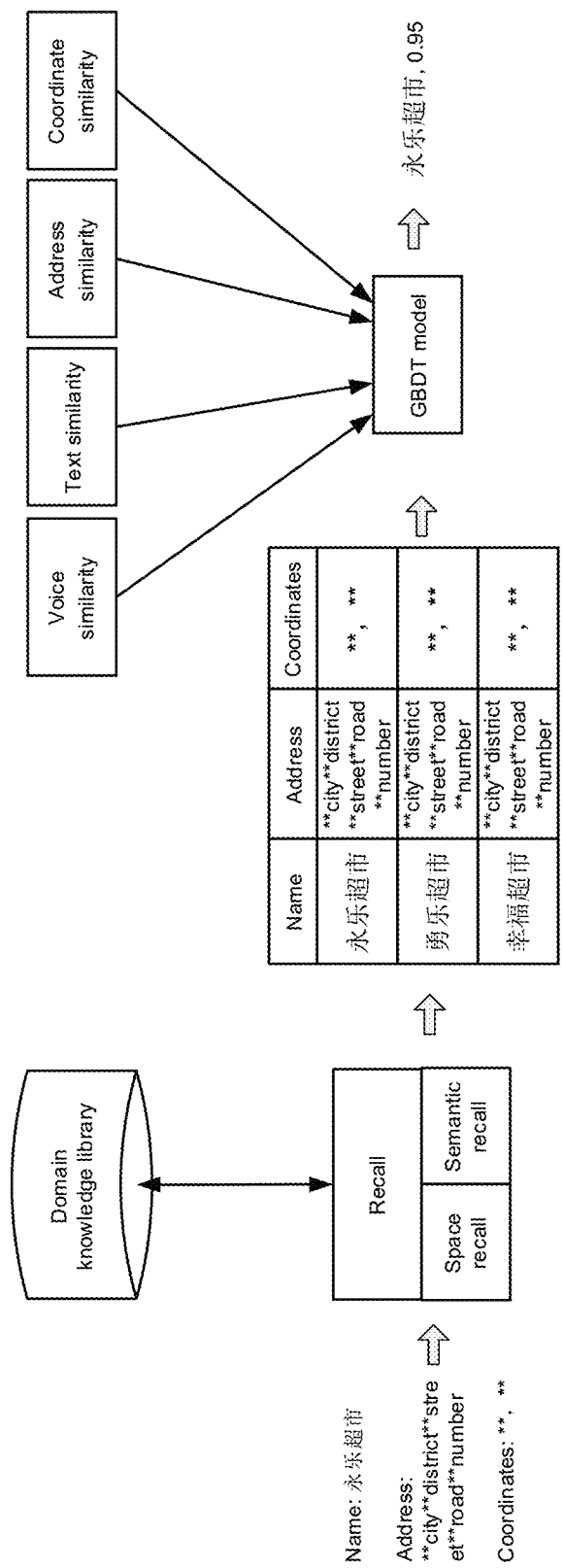
FIG. 7 is a schematic diagram of linking the geographical location point according to an embodiment of the disclosure.

For example, as shown in FIG. 7, "永乐超市 (Yongle supermarket)" is obtained by semantic analysis, and is classified into existing geographic location points in the domain knowledge library based on the voice, text, address, coordinates and other information of "永乐超市 (Yongle supermarket)" obtained from users. If the probability of classifying it into "勇乐超市 (Yongle supermarket)" is the highest and exceeds the preset threshold, "永乐超市 (Yongle supermarket)" obtained by semantic analysis will be corrected to be "勇乐超市 (Yongle supermarket)". GBDT (Gradient Boosting Decision Tree) algorithm may be used in classification.

By the process of linking, more accurate information of the object to be verified may be obtained by semantic analysis.

(3) Dialogue Management

Dialogue management is to decide the next response according to the result of semantic analysis and the context of the dialogue. The key point is to maintain the dialog state to determine the interaction with the user in order to obtain the final correct verification results.

Through the above semantic analysis process, the correct result may be recognized with high probability. However, if new POI is added, it cannot be guaranteed to be completely correct. There are also some situations in which semantic analysis is not applicable, which leads to the obtained geographic location information is not correct. In view of this, a multi-round dialogue mechanism may be introduced to determine the correctness of the object to be verified to the user.

Specifically, for the name of the geographical location point obtained by semantic analysis, the voice query for the character information contained in the name of the geographical location point is sent to the user. According to the text of the user's voice response, the user intention information is obtained through voice recognition and semantic analysis, and the correctness of the name of the geographical location point is determined according to the user intention information.

For example, through the above semantic analysis of the geographical location point name "勇乐超市 (Yongle supermarket)", a voice query "是勇敢的勇，欢乐的乐吗 ('yong' for 'yonggan' and 'le' for 'huanle')" may be further provided. If the user answers "是的 (Yes)", that is, the user's intention is positive, it is determined that the name of the geographical location point is correct. If the user answers "不是 (No)", that is to say, the user's intention is negative, it is determined that the name of the geographical location point obtained by semantic analysis is incorrect. The user can be further inquired to obtain the correct name of the geographical location point.

In addition, even if the user's voice response can be accurately recognized, many users may deliberately cheat the intelligent verification apparatus for many reasons, such as distrust, teasing and so on. In view of this, the present disclosure introduces a polygraph mechanism. Polygraph mechanism may include active polygraph mechanism and passive polygraph mechanism.

The active polygraph mechanism includes: asking the user about a content having a known result, obtaining the user's voice response, performing voice recognition and semantic analysis on the user's voice response, comparing the user's intention information and the information of the object to be verified with the known result, and if the user's intention information and the information of the object to be verified is consistent with the known result, determining that the user has passed the polygraph test; and if the user's intention information and the information of the object to be verified is not consistent with the known result, it is determined that the user has not passed the polygraph test. The text of voice response from users who fail to pass the polygraph test will not be adopted.

That is to say, in addition to asking the user about the content without known result, the user is also asked about the content with known result. Whether the user is lying or not is determined by the user's voice response to the content that has known result.

The passive polygraph mechanism includes: identifying whether the user is lying based on the emotion of the user's voice response, the response delay of different questions, and the big data statistics of the same type of geographical location points.

With the above polygraph mechanism, the accuracy of user feedback can be further guaranteed, so as to ensure the accuracy of data verification.

Furthermore, it is also possible to recognize at least one of an emotion of the user, an attribute of the user, and a current spatio-temporal information from the user's voice response to the voice query according to the present disclosure. According to the recognition results, a corresponding script is used to interact with the user. For example, it is possible to say good evening to the user in the evening and good morning to the user in the morning. It is possible to say "Hello beauty" to women users. It is possible to ask less to users who are already bored, ask more to users who are happy, and so on. In this way, different scripts may be used for different scenarios and different users, which is more flexible and humanized, reducing the user's hang up rate, and improving the recall rate of information verification.

(4) Voice Synthesis

Users are not robots, they are emotional. Natural voice broadcast plays a key role in the user's cooperation. If the voice synthesis is very poor, the user will hang up directly, which will affect information verification. In order to make the voice synthesis more natural, the voice synthesis model is pre-trained by using a voice generated by a manual customer service in verifying information with the user and a label text associated to the voice. The label text includes an attribute information label for a type of the object to be verified and/or a time information.

For verifying information of geographical location point, except for time information and information of geographical location point, other scripts are basically finite sets. However, existing voice synthesis services are relatively stiff and unnatural in broadcasting time information and geographical location information. Therefore, the time information and geographic location information are optimized specifically.

Since a large number of voices generated by manual customer service in verifying information with users have been accumulated in history, some voice data of human customer service with nice voice and clear pronunciation may be chosen as high-quality voice data. Through voice recognition and semantic analysis, high-quality voice data may be converted into text, and attribute information of the geographic location point and time information in the text are labeled. In this way, text-voice pairs are generated as training data. For example:

"请问是 幸福超市 吗?(Is this [Xingfu] supermarket?)", contents in [ ] are labeled as the name of POI;

"你们家是2020 年4月2 日2 开业吗? (Do you open on [Apr. 2, 2020]?")", contents in [ ] are labeled as time.

By training the voice synthesis model with such training data, the voice expression of the information of geographic location point and the time information is closer to human expression, being natural, fluent, nice and clear, thereby improving the user satisfaction and cooperation.

The above is a detailed description of the method provided in the present disclosure. An apparatus provided by the present disclosure is described below in detail in combination with the embodiment.

Figure 8:
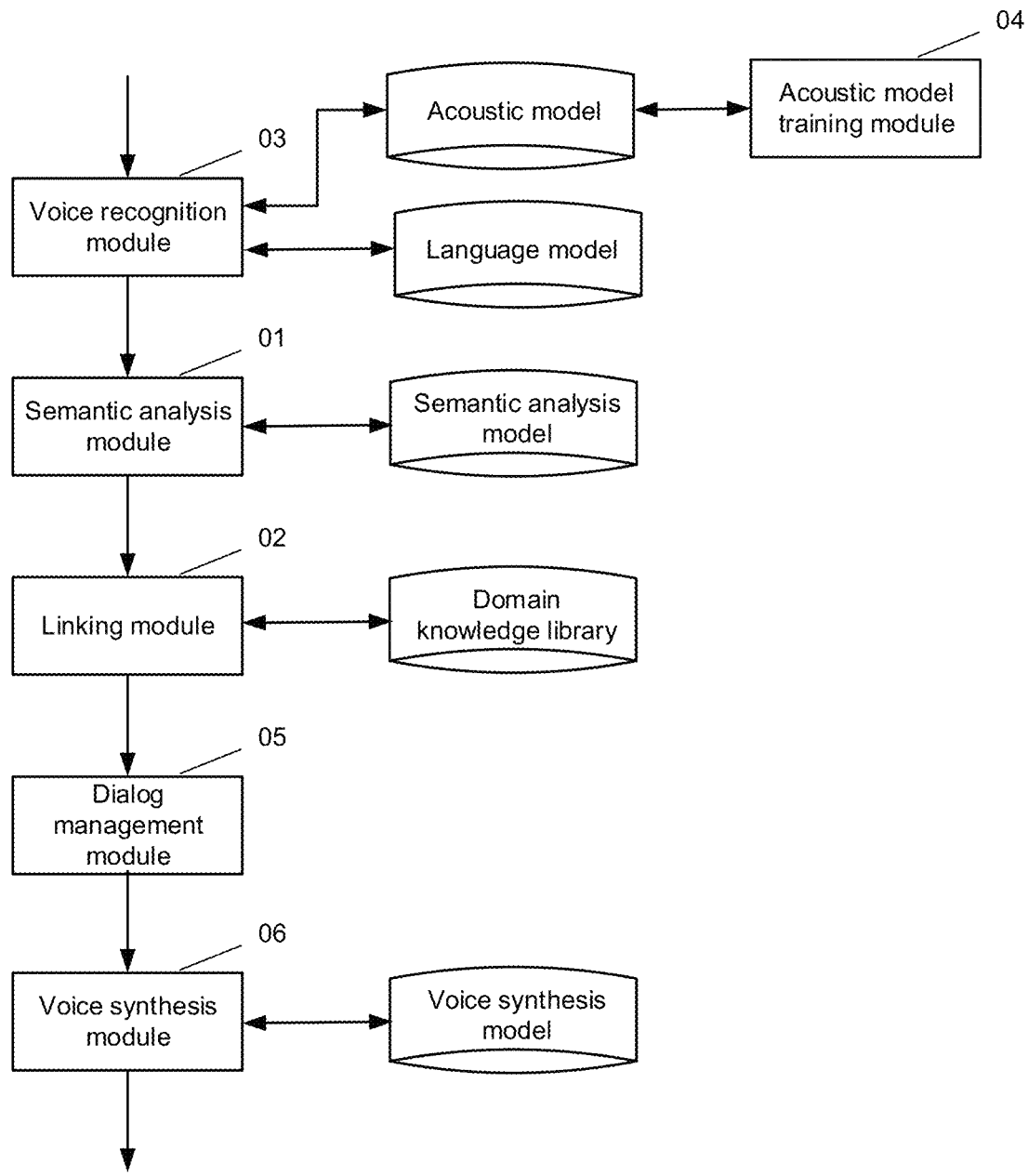
FIG. 8 is a block diagram of an apparatus of verifying information based on a voice interaction according to an embodiment of the present disclosure.

FIG. 8 is a block diagram of an apparatus of verifying information based on a voice interaction according to an embodiment of the present disclosure. As shown in FIG. 8, the apparatus may include a semantic analysis module 01. The apparatus may further include a linking module 02, a voice recognition module 03, an acoustic model training module 04, a dialogue management module 05 and a voice synthesis module 06. The main functions of each module is described below.

The semantic analysis module 01 is used to acquire a text of a voice response of a user to a voice inquiry, wherein the voice inquiry is provided for verifying information with the user; and input each character of the text of the voice response and a phonetic information associated with the each character to a pre-trained semantic analysis model so as to obtain an user intention information and/or an information of an object to be verified output by the pre-trained semantic analysis model, wherein the user intention information includes a confirmation, a denial, an answer, or a question.

The semantic analysis model includes an embedding layer and a sequence modeling layer, and further includes a mapping layer and/or a prediction layer.

The embedding layer is used to encode the each character and the phonetic information associated with the each character.

The sequence modeling layer is used to learn a semantic dependency between characters by using an encoding result from the embedding layer.

The mapping layer is used to obtain the user intention information through mapping by using a max-pooling result of an implicit vector output by the sequence modeling layer.

The prediction layer is used to predict the information of the object to be verified by using the implicit vector of each sequence output by the sequence modeling layer.

The linking module 02 is used to link the information of the object to be verified to an object information in a domain knowledge library related to the object to be verified, in response to the information of the object to be verified is acquired by the semantic analysis module.

Functions and specific operations of the semantic analysis module 01 and the linking module 02 can be found in the description of the semantic analysis in the method embodiment, and would not be described in detail herein to avoid redundancy.

The voice recognition module 03 is used to perform a voice recognition on the voice response of the user to the voice inquiry, by using an acoustic model and a language model, so as to obtain the text of the voice response. Dictionary data for a type of the object to be verified is introduced in training of the acoustic model and the language model.

The acoustic model training module 04 is used to obtain training data by using a voice generated by a manual customer service in verifying information with the user and a label text associated to the voice; and optimize parameters of an initial acoustic model by using the training data, wherein a learning rate of the initial acoustic model is reduced.

Functions and specific operations of the voice recognition module 03 and the acoustic model training module 04 can be found in the description of the voice recognition in the method embodiment, and will not be described in detail herein to avoid redundancy.

The dialogue management module 05 is used to determine whether the information of the object to be verified is correct by a multi-round dialogue with the user, including: sending to the user a voice query for a character information contained in the information of the object to be verified; and determining whether the information of the object to be verified is correct according to the user intention 5 information for the text of the voice response of the user.

The dialogue management module 05 is used to compare the user intention information and/or the information of the object to be verified with a known result; determine that the user has passed a polygraph test in response to determining that the user intention information and/or the information of the object to be verified is consistent with the known result; determine that the user fails to pass the polygraph test in response to determining that the user intention information and/or the information of the object to be verified is not consistent with the known result; and discard the text of the voice response of the user failing to pass the polygraph test.

The dialogue management module 05 is used to recognize at least one of an emotion of the user, an attribute of the user, and a current spatiotemporal information from the voice response of the user to the voice query; and perform a subsequent voice interaction by using a corresponding script according to a result of the recognizing.

Function and specific operation of the dialogue management module 05 can be found in the description of the dialogue management in the method embodiment, and will not be described in detail herein to avoid redundancy.

The voice synthesis module 06 is used to generate the voice query by using a voice generated by a manual customer service in verifying information with the user and a label text associated to the voice, and the label text includes an attribute information label for a type of the object to be verified and/or a time information.

Function and specific operation of the voice synthesis module 06 can be found in the description of the voice synthesis in the method embodiment, and will not be described in detail herein to avoid redundancy.

Figure 9:
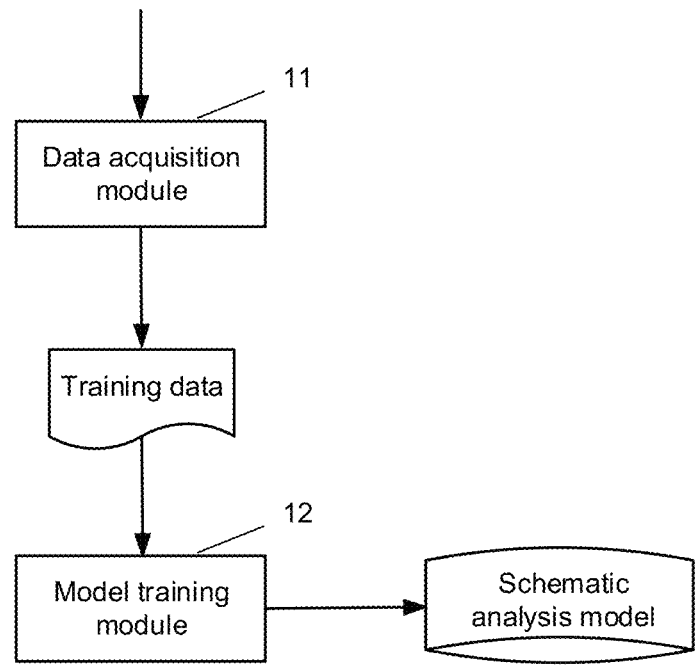
FIG. 9 is a block diagram of an apparatus of training a semantic analysis model according to an embodiment of the disclosure.

FIG. 9 is a block diagram of an apparatus of training a semantic analysis model according to an embodiment of the disclosure. As shown in FIG. 9, the apparatus includes a data acquisition module 11 and a model training module 12. The main functions of each module are described below.

The data acquisition module 11 is used to acquire training data, wherein the training data includes a text of a voice response of a user to a voice query, and a label denoting a user intention information and/or an information of the object to be verified for the text of the voice response The model training module 12 is used to train the semantic analysis model, by taking each character in the text of the voice response in the training data and phonetic information associated with the each character as an input of the semantic analysis model and taking the user intention information and/or the information of the object to be verified denoted by the label as a target output of the semantic analysis model, wherein the user intention information includes a confirmation, a denial, an answer, or a question. The phonetic information includes Chinese pinyin and other phonetic information.

Specifically, the data acquisition module 11 may obtain a seed sample by acquiring and manually labeling a text of a high-frequency voice response for a same voice query; cluster texts of voice responses in a historical database by similarity using the seed sample, wherein the texts of voice responses are generalized by object information; and acquire the text of the voice response corresponding to each user intention information as the training data, according to a result of the clustering.

Specifically, the semantic analysis model includes an embedding layer and a sequence modeling layer, and further includes a mapping layer and/or a prediction layer.

The embedding layer is used to encode the each character and the phonetic information associated with the each character.

The sequence modeling layer is used to learn a semantic dependency between characters by using an encoding result from the embedding layer.

The mapping layer is used to obtain the user intention information through mapping by using a max-pooling result of an implicit vector output by the sequence modeling layer.

The prediction layer is used to predict the information of the object to be verified by using the implicit vector of each sequence output by the sequence modeling layer.

In the technical solution of the present disclosure, the acquisition, storage, and application of the user's personal information involved all comply with relevant laws and regulations, and do not violate public order and good customs.

According to an embodiment of the present disclosure, the present disclosure further provides an electronic device and a readable storage medium.

Figure 10:
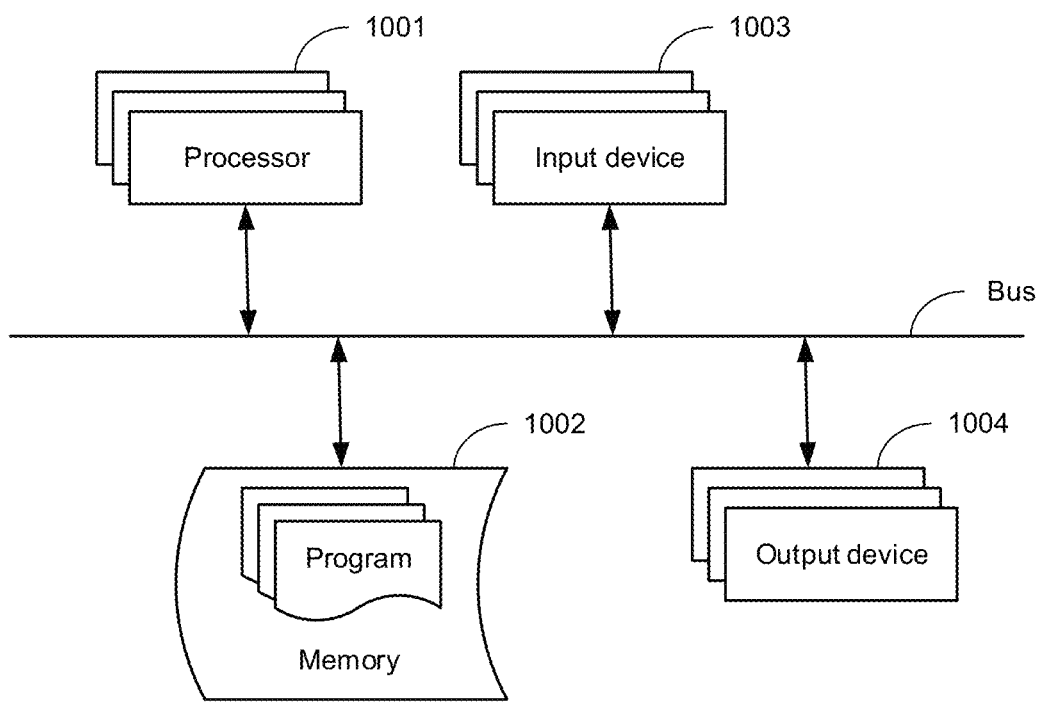
FIG. 10 is a block diagram of an electronic device for implementing an embodiment of the present disclosure.

FIG. 10 is a block diagram of an electronic device for the methods according to the embodiments of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital processors, cellular phones, smart phones, wearable devices, and other similar computing devices. The components as illustrated herein and connections, relationships, and functions thereof are merely examples, and are not intended to limit the implementation of the present disclosure as described and/or required herein.

As shown in FIG. 10, the electronic device includes one or more processors 1001, a memory 1002, and interface(s) for connecting various components, including high-speed interface(s) and low-speed interface(s). The various components are connected to each other by using different buses, and can be installed on a common motherboard or installed in other manners as required. The processor may process instructions executed in the electronic device, including instructions stored in or on the memory to display graphical information of GUI (Graphical User Interface) on an external input/output apparatus (such as a display device coupled to an interface). In other embodiments, a plurality of processors and/or a plurality of buses may be used with a plurality of memories if necessary. Similarly, a plurality of electronic devices can be connected in such a manner that each electronic device provides a part of necessary operations (for example, as a server array, a group of blade servers, or a multi-processor system). One processor 1001 is taken as an example in FIG. 10.

The memory 1002 is the non-transitory computer-readable storage medium provided by the present disclosure. The memory stores instructions executable by at least one processor, to cause the at least one processor to perform the methods provided by the present disclosure. The non-transitory computer-readable storage medium of the present disclosure stores computer instructions for allowing a computer to perform the methods provided by the present disclosure.

As a non-transitory computer-readable storage medium, the memory 1002 can be used to store non-transitory software programs, non-transitory computer-executable programs, and modules, such as program instructions/modules corresponding to the methods in the embodiments of the present disclosure. The processor 1001 may perform various functional applications and data processing of the server by executing the non-transitory software programs, instructions, and modules stored in the memory 1002, thereby implementing the methods in the method embodiments described above.

The memory 1002 may include a program storage area and a data storage area. The program storage area may store an operating system and an application program required by at least one function. The data storage area may store data etc. generated by using the electronic device. In addition, the memory 1002 may include a high-speed random access memory, and may further include a non-transitory memory, such as at least one magnetic disk storage device, a flash memory device, or other non-transitory solid-state storage devices. In some embodiments, the memory 1002 may optionally include a memory located remotely with respect to the processor 1001, and such remote memory may be connected to the electronic device through a network. Examples of the network described above include, but are not limited to, Internet, intranet, local area network, mobile communication network, and combination thereof.

The electronic device may further include: an input device 1003 and an output device 1004. The processor 1001, the memory 1002, the input device 1003, and the output device 1004 may be connected by a bus or in other manners. In FIG. 10, the connection by a bus is taken as an example.

The input device 1003 may receive input information of numbers or characters, and generate key input signals related to user settings and function control of the electronic device, such as touch screen, keypad, mouse, trackpad, touchpad, indicator stick, one or more mouse buttons, trackball, joystick and other input devices. The output device 1004 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen. Various embodiments of the systems and technologies described herein can be implemented in digital electronic circuit systems, integrated circuit systems, application-specific ASICs (application-specific fused circuits), computer hardware, firmware, software, and/or combinations thereof. These embodiments may be implemented by one or more computer programs executed and/or interpreted at a programmable system including at least one programmable processor. The programmable processor can be a dedicated or general-purpose programmable processor, which may receive data and instructions from a storage system, at least one input device, and at least one output device, and transmit the data and instructions to the storage system, the at least one input device, and the at least one output device.

These computer programs (also referred as programs, software, software applications, or codes) include machine instructions for programmable processors, and may be implemented using high-level programming languages, object-oriented programming languages, and/or assembly/machine language. As used herein, the terms "machine-readable medium" and "computer-readable medium" refer to any computer program product, apparatus, and/or device (e.g., magnetic disks, optical disks, memory, programmable logic devices (PLD)) for providing machine instructions and/or data to a programmable processor, including machine-readable media for receiving machine instructions as machine-readable signals. The term "machine-readable signal" refers to any signal for providing machine instructions and/or data to a programmable processor.

In order to implement interaction with the user, the systems and technologies described herein may be implemented by a computer including a display device (for example, CRT (Cathode Ray Tube) or LCD (Liquid Crystal Display)) display) for displaying information to the user; and a keyboard and a pointing device (for example, a mouse or a trackball) through which the user may provide the input to the computer. Other types of devices may also be used to implement interaction with the user. For example, the feedback provided to the user may be any form of sensory feedback (e.g., visual feedback, auditory feedback, or tactile feedback), and the input from the user may be received in any form (including acoustic input, voice input, or tactile input).

The systems and technologies described herein may be implemented in a computing system including back-end components (for example, as a data server), or a computing system including middleware components (for example, an application server), or a computing system including front-end components (for example, a user computer having a graphical user interface or a web browser through which the user can interact with the implementation of the systems and technologies described herein), or a computing system including any combination of such back-end components, middleware components, or front-end components. The components of the system can be connected to each other through digital data communication (for example, a communication network) in any form or through any medium. Examples of communication networks include: LAN (Local Area Network), WAN (Wide Area Network), and Internet.

A computer system may include a client and a server. The client and server are generally far away from each other and usually interact through a communication network. The relationship between the client and the server is generated through computer programs running on the corresponding computers and having a client-server relationship with each other. The server can be a cloud server, a server of distributed system, or a server combined with blockchain.

It should be understood that steps of the processes illustrated above can be reordered, added or deleted in various manners. For example, the steps described in the present disclosure can be performed in parallel, sequentially, or in different orders, as long as a desired result of the technical solution of the present disclosure can be achieved, and this is not limited herein.

The above embodiments do not constitute a limitation on the scope of protection of the present disclosure. Those skilled in the art should understand that various modifications, combinations, sub-combinations, and substitutions can be made according to design requirements and other factors. Any modifications, equivalent replacements and improvements made within the spirit and principles of the present disclosure shall be included in the scope of the disclosure.

We claim:

1. A method of verifying information based on a voice interaction, comprising:
   acquiring a text of a voice response of a user to a voice inquiry, wherein the voice inquiry is provided for verifying information with the user;
   inputting each character of the text of the voice response and a phonetic information associated with the each character to a pre-trained semantic analysis model so as to obtain user intention information and/or information of an object to be verified output by the pre-trained semantic analysis model, wherein the user intention information comprises a confirmation, a denial, an answer, or a question, and the phonetic information comprises Chinese pinyin; and
   in response to the information of the object to be verified is acquired, classifying the information of the object to be verified into the domain knowledge library based on at least one of a voice similarity, a text similarity and an attribute similarity, so as to determine the object information in the domain knowledge library to which the information of the object to be verified is linked,
   wherein the semantic analysis model comprises an embedding layer and a sequence modeling layer, and further comprises a mapping layer and/or a prediction layer, wherein
   the embedding layer is configured to encode the each character and the phonetic information associated with the each character;
   the sequence modeling layer is configured to learn a semantic dependency between characters by using an encoding result from the embedding layer;
   the mapping layer is configured to obtain the user intention information through mapping by using a max-pooling result of an implicit vector output by the sequence modeling layer; and
   the prediction layer is configured to predict the information of the object to be verified by using the implicit vector of each sequence output by the sequence modeling layer.

2. The method of claim 1, further comprising:
   updating the information of the object to be verified with the determined object information, in response to the object information linked to the information of the object to be verified is determined.

3. The method of claim 1, wherein the acquiring a text of a voice response of a user to a voice inquiry comprises:
performing a voice recognition on the voice response of the user to the voice inquiry, by using an acoustic model and a language model, so as to obtain the text of the voice response;
wherein dictionary data for a type of the object to be verified is introduced in training of the acoustic model and the language model.

4. The method of claim 3, wherein the acoustic model is pre-trained by:
obtaining training data by using a voice generated by a manual customer service in verifying information with the user and a label text associated to the voice; and
optimizing parameters of an initial acoustic model by using the training data, wherein a learning rate of the initial acoustic model is reduced.

5. The method of claim 1, further comprising:
determining whether the information of the object to be verified is correct by a multi-round dialogue with the user.

6. The method of claim 5, wherein the determining whether the information of the object to be verified is correct by a multi-round dialogue with the user comprises:
sending to the user a voice inquiry for a character information contained in the information of the object to be verified; and
determining whether the information of the object to be verified is correct according to the user intention information for the text of the voice response of the user.

7. The method of claim 1, further comprising:
comparing the user intention information and/or the information of the object to be verified with a known result;
determining that the user has passed a polygraph test in response to determining that the user intention information and/or the information of the object to be verified is consistent with the known result;
determining that the user fails to pass the polygraph test in response to determining that the user intention information and/or the information of the object to be verified is not consistent with the known result; and
discarding the text of the voice response of the user failing to pass the polygraph test.

8. The method of claim 1, further comprising:
recognizing at least one of an emotion of the user, an attribute of the user, and a current spatiotemporal information from the voice response of the user to the voice inquiry; and
performing a subsequent voice interaction by using a corresponding script according to a result of the recognizing.

9. The method of claim 1, further comprising: generating the voice inquiry by using a voice synthesis model, wherein the voice synthesis model is pre-trained by using a voice generated by a manual customer service in verifying information with the user and a label text associated to the voice, and the label text comprises an attribute information label for a type of the object to be verified and/or a time information.

10. The method of claim 1, wherein the information of the object to be verified comprises information of a geographic location point.

11. A method of training a semantic analysis model, comprising:
acquiring training data, wherein the training data comprises a text of a voice response of a user to a voice inquiry, and a label denoting user intention information and/or information of the object to be verified for the text of the voice response; and
training the semantic analysis model, by taking each character in the text of the voice response in the training data and phonetic information associated with the each character as an input of the semantic analysis model and taking the user intention information and/or the information of the object to be verified denoted by the label as a target output of the semantic analysis model, wherein the user intention information comprises a confirmation, a denial, an answer, or a question, and the phonetic information comprises Chinese pinyin,
wherein the acquiring training data comprises:
obtaining a seed sample by acquiring and manually labeling a text of a high-frequency voice response for a same voice inquiry;
clustering texts of voice responses in a historical database by similarity using the seed sample, wherein the texts of voice responses are generalized by object information; and
acquiring the text of the voice response corresponding to each user intention information as the training data, according to a result of the clustering, and
wherein the semantic analysis model comprises an embedding layer and a sequence modeling layer, and further comprises a mapping layer and/or a prediction layer, wherein
the embedding layer is configured to encode the each character and the phonetic information associated with the each character;
the sequence modeling layer is configured to learn a semantic dependency between characters by using an encoding result from the embedding layer;
the mapping layer is configured to obtain the user intention information through mapping by using a max-pooling result of an implicit vector output by the sequence modeling layer; and
the prediction layer is configured to predict the information of the object to be verified by using the implicit vector of each sequence output by the sequence modeling layer.

12. An electronic device, comprising:
at least one processor; and
a memory communicatively connected to the at least one processor, wherein the memory has instructions executable by the at least one processor stored thereon, and the instructions, when executed by the at least one processor, cause the at least one processor to implement the method of claim 1.

13. A non-transitory computer-readable storage medium storing computer instructions for a computer to implement the method of claim 1.

14. An electronic device, comprising:
at least one processor; and
a memory communicatively connected to the at least one processor, wherein the memory has instructions executable by the at least one processor stored thereon, and the instructions, when executed by the at least one processor, cause the at least one processor to implement the method of claim 11.

15. A non-transitory computer-readable storage medium storing computer instructions for a computer to implement the method of claim 11.

* * * * *